P. S. H. NEWELL.
ILLUSTRATED BOOK AND PAMPHLET.
APPLICATION FILED JUNE 1, 1910.
970,943.
Patented Sept. 20, 1910.
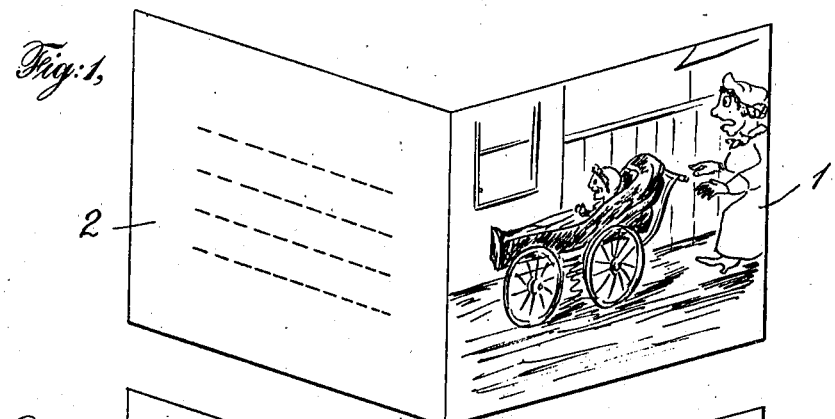
Fig. 1,
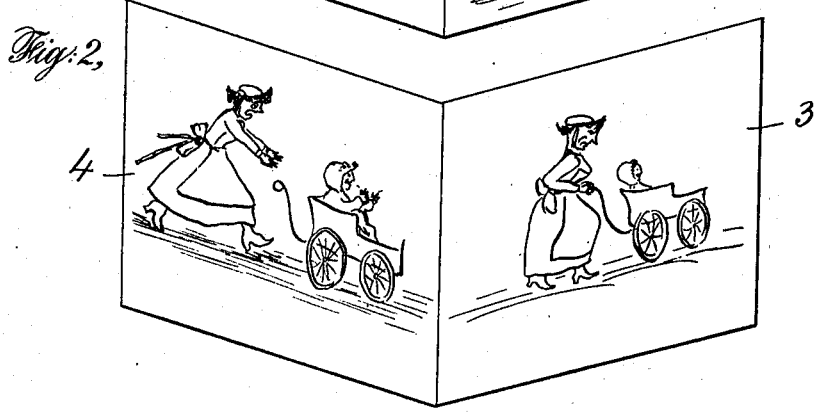
Fig. 2,
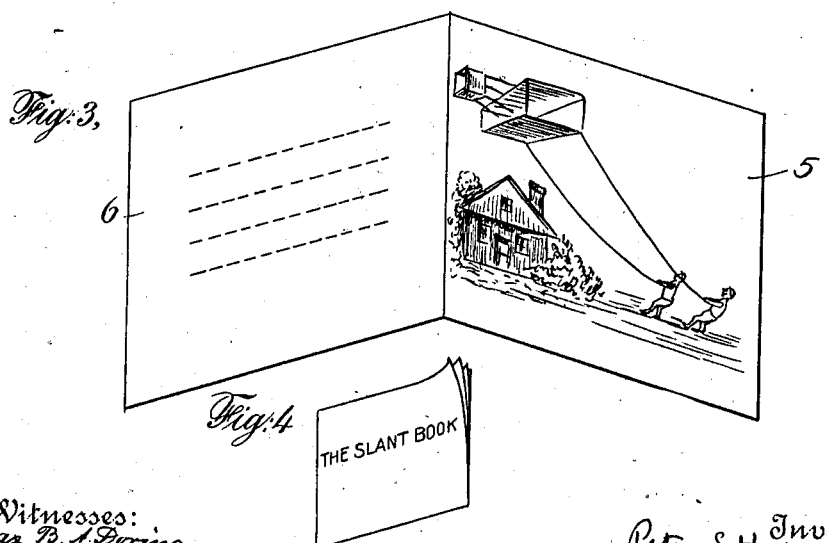
Fig. 3,
Fig. 4
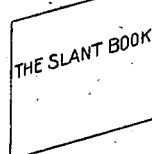
Witnesses:
Max B. A. Doring
Beatrice M. Young
Peter S. H. Newell Inventor
By his Attorney Augustus T. Gurlitz
THE NORRIS PETERS CO., WASHINGTON, D. C.

UNITED STATES PATENT OFFICE.

PETER S. H. NEWELL, OF LEONIA, NEW JERSEY.

ILLUSTRATED BOOK AND PAMPHLET.

970,943.

Specification of Letters Patent. Patented Sept. 20, 1910.

Application filed June 1, 1910. Serial No. 564,390.

*To all whom it may concern:*

Be it known that I, PETER S. H. NEWELL, of Leonia, in the State of New Jersey, have invented certain new and useful Improvements in Illustrated Books and Pamphlets; and I do hereby declare that the following is a full, clear, and exact description of the same, reference being had to the accompanying drawings, making part of this specification, and to the characters of reference marked thereon.

As such books have been heretofore made it has been usual to form or shape them in rectangular configuration, with the result that no, or but little, variety in the form of the books could be obtained, and the constant uniformity of such books in such forms, fails to meet the desire for change and variety which is strong in many persons, especially in children and young people. In addition to that, such monotonous form of book does not lend itself to impart any suggestion of action or motion to the design or pictorial representations which may be shown therein, so that whether the pictures represent flying or climbing upward, or sliding down hill, it is always the same rectangular form of book and page on which such motion is to be suggested or delineated.

In books made according to my invention the shape of the book itself and of the pages therein suggests the action or motion which is intended to characterize the illustration contained therein.

In the drawing Figure 1 represents a book made according to my invention, the same being open. Fig. 2 represents another example of my invention also by a book shown open. Fig. 3 also represents another example of my invention, the book being shown open. Fig. 4 represents a book closed corresponding to the examples shown in Figs 1 and 2.

Similar characters of reference indicate like parts in all the drawings.

It will be seen that in each example of my invention the inclination of the pages in the book and of the book itself at once suggests some action or motion which is characteristic of the pictures contained therein. Thus in the series of designs making up the book of rhomboidal form, like that shown in Fig. 1, one of the pictures may show a baby carriage freed from the nurse's hand and running down an incline as shown at 1, and suitable descriptive matter in prose or verse may be printed upon the opposite page as suggested at 2 in Fig. 1. A series of designs illustrating different incidents of the illustration of a baby carriage running down inclines and meeting with various adventures in its course, might form a booklet or pamphlet in which my invention would be developed.

In Fig. 2 a design is shown at 3 which suggests the difficulty of ascending or moving an object upward of the inclination, and this may be shown with or without reading matter on the same page, while at 4 an illustration similar to that at 1 in Fig. 1 could be shown.

It is obvious that in carrying out my invention interesting pictorial illustration may be devised, such as would gain other advantages from the shape of the book. For instance in a book shaped like the examples shown in Figs. 1 and 2 the illustration at 3 might indicate the descent of some objects to meet the descending objects shown at 4, and suggesting collision at the meeting point, which could be developed either on the same or on succeeding pages.

In Fig. 3 a series of illustrations may be shown indicating upward motion as for instance, the flight of an aeroplane as shown at 5, while upon the opposite page suitable verses or reading matter may be printed as indicated at 6. In the example of the invention shown in Fig. 3 furthermore, designs could be drawn to show battle scenes or other contests in which the figures at 5 and also at 6 are ascending toward each other, instead of having only reading matter at 6 in that figure, and succeeding pages might show the same forces retreating.

In carrying out my invention it will readily be seen that a large variety of pictorial illustrations may be devised conforming to the inclination of the particular book which it is designed to prepare, and in which the suggestion of downward or upward motion is desirable or significant. Such designs of course will depend for their interest upon the skill and capacity of the artist or illustrator, and the writer of the verse or other descriptive matter, and I do not limit myself to the particular designs or pictorial illustrations figured in the drawings, but

Having thus described my invention, what

I claim as new and desire to secure by Letters Patent, is:

1. A book of rhomboidal form, comprising a series of leaves of like form provided with designs the ground lines whereof are parallel to the base of the leaves.

2. A book consisting of pictorial representations on leaves of rhomboidal form, such representations having their ground lines parallel to the base of the leaves.

3. A collection of leaves of rhomboidal form, provided with designs on such leaves, the ground lines of which designs are parallel to the base of the leaves.

4. A leaf of rhomboidal form in combination with a pictoral design figured thereon such design having its ground line parallel to the base of the leaf.

PETER S. H. NEWELL.

Witnesses:
WILLIAM WADSWORTH,
BENJAMIN A. MORTON.